(12) United States Patent
Wong

(10) Patent No.: US 8,960,083 B2
(45) Date of Patent: Feb. 24, 2015

(54) MULTIFUNCTION BARBECUE OVEN

(71) Applicant: Yat Wong, Kowloon (HK)

(72) Inventor: Yat Wong, Kowloon (HK)

( * ) Notice: Subject to any disclaimer, the term of this patent is extended or adjusted under 35 U.S.C. 154(b) by 299 days.

(21) Appl. No.: 13/667,864

(22) Filed: Nov. 2, 2012

(65) Prior Publication Data

US 2014/0013961 A1    Jan. 16, 2014

(30) Foreign Application Priority Data

Jul. 12, 2012    (CN) ............... 2012 2 0338315 U

(51) Int. Cl.
*A47J 37/07* (2006.01)
*A47J 37/04* (2006.01)

(52) U.S. Cl.
CPC ............ *A47J 37/049* (2013.01); *A47J 37/0763* (2013.01)
USPC .............. 99/419; 99/421 A; 99/449; 126/9 R; 126/25 A

(58) Field of Classification Search
CPC ...... A47J 37/07; A47J 37/049; A47J 37/0763
USPC .... 99/419, 421 A, 421 V, 449; 126/9 R, 25 A
See application file for complete search history.

(56) References Cited

U.S. PATENT DOCUMENTS

| | | | | |
|---|---|---|---|---|
| 5,293,859 | A | * | 3/1994 | Lisker ............................. 126/26 |
| 5,404,864 | A | * | 4/1995 | Kent, Jr. ........................ 126/9 B |
| 6,439,111 | B1 | * | 8/2002 | Lu .................................... 99/449 |
| 7,069,842 | B1 | * | 7/2006 | Liao ............................ 99/421 A |
| 8,794,130 | B2 | * | 8/2014 | Ikeda .............................. 99/419 |
| 2006/0075905 | A1 | * | 4/2006 | Shih ................................ 99/419 |

* cited by examiner

*Primary Examiner* — Reginald L Alexander
(74) *Attorney, Agent, or Firm* — Birch, Stewart, Kolasch & Birch, LLP

(57) ABSTRACT

A multifunction barbecue oven includes a main furnace, an auxiliary furnace arranged below the main furnace and a charcoal disc selectively placed on the bottom of the main furnace or the bottom of the auxiliary furnace. The top of the main furnace has an inclined tile roof shaped main furnace top portion with hinged left and right triangular side plates and a detachable connecting rod means. The furnace chamber can be covered by hinged front and rear covers. The handled fork can be inclined erected on top portion of the main furnace or inclined inserted into the interior of the main furnace chamber and the auxiliary furnace chamber for grilling or roasting in a hanging manner to avoid the food to contact the iron grid. The barbecue oven can be used for grilling, roasting, grilled and hot pot cooking and other function, and can be stored and carried conveniently.

15 Claims, 7 Drawing Sheets

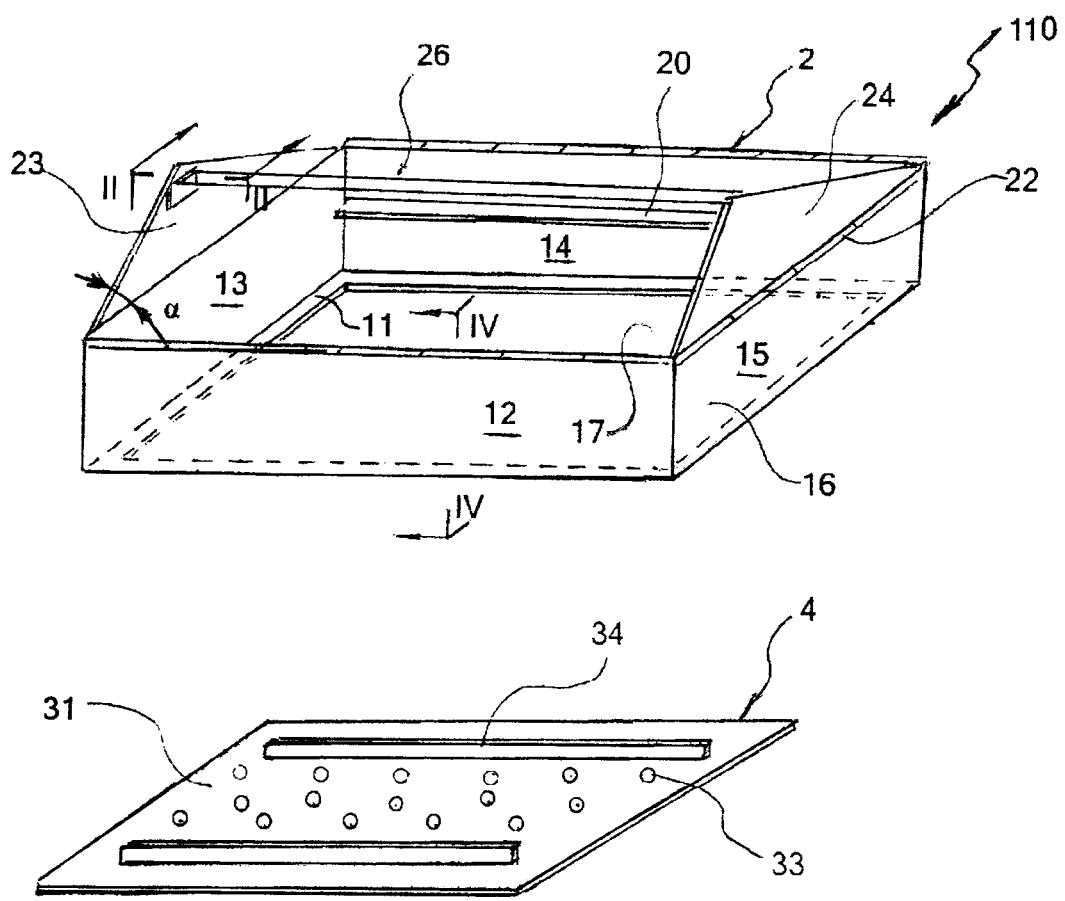
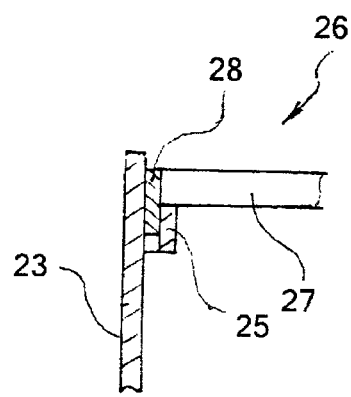
FIG. 1
FIG. 2

MULTIFUNCTION BARBECUE OVEN

CROSS-REFERENCE TO RELATED APPLICATIONS

The application claims the priority benefits of Chinese utility model patent application No. 201220338315.3 filed on Jul. 12, 2012, the contents of which are hereby incorporated by reference in its entirety.

FIELD OF THE INVENTION

The present invention relates to a barbecue oven and, more particularly, relates to a multifunction barbecue oven for grilling, roasting, teppanyaki grilling and hot pot cooking.

BACKGROUND OF THE INVENTION

Barbecue is favorite food of many people. A traditional barbecue oven generally includes a furnace body, an iron grid shelf set in an upper part of the furnace body and a fuel or charcoal receptacle placed on a bottom of the furnace body. Food supported on the iron grid is grilled directly on burning charcoal. During barbecuing, oil secreted from food and some condiments will drop directly onto the burning charcoal, which would generate flames and heavy smoke and make the food burnt. The gravy stuck to the iron grid will be burnt and become soot carbon, which would become carcinogens upon contacting food. In addition, the existing barbecue ovens are generally disadvantageous in that they consume a plenty of charcoal, only have single usage, and are not portable.

SUMMARY OF THE INVENTION

In view of above disadvantages, the object of the present invention is to provide a multifunction barbecue oven, by which the grilled foods are avoided to be contacted with the iron grid, the grilled foods are evenly heated and are not charred, and the operation of the multifunction barbecue oven is convenient and fast.

The another object of the present invention is to provide a multifunction barbecue oven, which has a variety of functions, such as charcoal grill, roasting, teppanyaki grill and hot pot cooking.

The further object of the present invention is to provide a multifunction barbecue oven, which is convenient to storage and carry.

The present invention provides a barbecue oven comprising: a main furnace including a bottom frame, as well as a front wall, a left wall, a rear wall and a right wall erected from the bottom frame to form a rectangular main furnace body with an open top and an open bottom, in which the interior of the main furnace body defines a main furnace chamber; a pair of horizontally extending support bars being arranged respectively on an inner surface of the front wall and the rear wall and the distance of the support bars from a top edge of the front wall and the rear wall being approximately ⅓ of the height of the front wall and the rear wall; a left triangular side panel and a right triangle side panel being pivotally connected respectively to the top edge of the left side wall and the top edge of the right side wall by hinges respectively, the left triangle side panel and the right triangular side panel being pivotal about the hinges respectively between a downward position in which the left triangle side panel and the right triangular side panel lying on an outer surface of the left side wall and the right side wall respectively and an upward vertical position, an angle between the waist edge and bottom edge of the triangle left side panel and the triangular right side panel being 35-45 degrees, respectively; an inward recessed pocket-shaped socket being formed near a top position of each triangle side panel on the inner surface of the left triangle side panels and the right triangular side panels; and a detachable connecting rod means having a two-bar connector and a pair of inserters fixed at its both ends, the inserters being adapted to be inserted into the pocket-shaped socket; a charcoal disc including a chassis with a plurality of vents provided therethrough and two bars disposed near a front edge and a rear edge of the chassis, the peripheral dimension of the charcoal disc being slightly smaller than that of the main furnace chamber; and a plurality of handled forks including a single-handled long fork and a single-handled short fork, each having a single handle and a plurality of points connected thereto.

Preferably the barbecue oven is configured such that the left triangular side panel and the right triangle side panel of the main furnace are set in the upward vertical position, the connecting rod means are inserted via the inserters into the pocket-shaped socket and connected integrally with the left triangular side panel and the right triangular side panel, and the left triangular side plate, the right triangular side plate and the connecting rod means form a top portion of the main furnace which has a tile roof shape.

Preferably the charcoal disc is arranged on the bottom frame of the main furnace, the single-handled short fork is inclinedly erected on top portion of the main furnace and/or is inclinedly inserted into the interior of the main furnace chamber.

Preferably the single-handled short fork is obliquely erected between the connecting rod and the top edge of the front wall or the top edge of the rear wall with the handle in a downward direction, and/or the single-handled short fork is obliquely erected between the connecting rod and the support bar of the front wall or the rear wall of the main furnace with the handle in an upward direction, and/or the single-handled short fork is obliquely erected between the connecting rod and the bottom frame of the main furnace with the handle in an upward direction.

Preferably the babercue oven further comprises an auxiliary furnace arranged below the main furnace, in which the auxiliary furnace includes a top frame and a base plate, as well as a front wall and a rear wall each connected to both of the top frame and the bottom plate, and a left side wall and a right side wall being pivotally connected respectively to the left and right edges of the top frame by hinges respectively, to form an open top rectangular shaped auxiliary furnace body, the interior of the auxiliary furnace body defining an auxiliary furnace chamber, the left side wall and the right side wall being pivotal about hinges respectively between a downward position in which the left side wall and the right side wall close the auxiliary furnace chamber and an upward position in which the left side wall and the right side wall open the auxiliary furnace chamber or rest on the top frame.

Preferably the main furnace further comprises a front cover and a rear cover which are pivotally connected respectively to the top edge of the front wall and the top edge of the rear wall by hinges respectively, the front cover and the rear cover being pivotal about the hinges respectively between its downward position and its upward and inward position.

Preferably the barbecue oven is configured such that the left triangular side panel and the right triangle side panel are set in the upward vertical position, the connecting rod means are inserted via the inserters at both ends thereof into the pocket-shaped socket and connected integrally with the left triangular side panel and the right triangular side panel, the left triangular side plate, the right triangular side plate and the connecting rod means form a top portion of the main furnace which has a tile roof shape, and the front cover and the rear cover contact respectively the waist edges of the left triangular side panel and the right triangular side panel to close more than half of the top portion of the furnace.

Preferably the charcoal disc is arranged on the bottom frame of the main furnace, the single-handled short fork is obliquely erected between the connecting rod and the support bar of the front wall or the rear wall of the main furnace with the handle in an upward direction, and/or the single-handled short fork is obliquely erected between the connecting rod and the bottom frame of the main furnace with the handle in an upward direction.

Preferably the babercue oven further comprises an auxiliary furnace arranged below the main furnace, in which the auxiliary furnace includes a top frame and a base plate, as well as a front wall and a rear wall each connected to both of the top frame and the bottom plate, and a left side wall and a right side wall being pivotally connected respectively to the left and right edges of the top frame by hinges respectively, to form an open top rectangular shaped auxiliary furnace body, the interior of the auxiliary furnace body defining an auxiliary furnace chamber, the left side wall and the right side wall being pivotal about hinges respectively between a downward position in which the left side wall and the right side wall close the auxiliary furnace chamber and an upward position in which the left side wall and the right side wall open the auxiliary furnace chamber or rest on the top frame.

Preferably the charcoal disc is arranged on the bottom frame of the main furnace, the single-handled short fork is obliquely erected between the connecting rod and the support bar of the front wall or the rear wall of the main furnace with the handle in an upward direction, and/or the single-handle short fork is obliquely erected between the connecting rod and the bottom frame of the main furnace with the handle in an upward direction.

Preferably the charcoal disc is arranged on the bottom plate of the auxiliary furnace, and the single-handled long fork is obliquely erected between the connecting rod and the bottom plate of the auxiliary furnace with the handle in an upward direction.

Preferably the barbecue oven is configured such that the charcoal disc is arranged on the bottom frame of the main furnace, the left triangular side panel and the right triangle side panel of the main furnace are set in a downward position, and the front cover and the rear cover of the main furnace are in a position adjacent to top edges of the left side wall and the right wall to form an tilt-shaped flat top teppanyaki plate.

Preferably the babercue oven further comprises an auxiliary furnace, in which the auxiliary furnace includes a top frame and a base plate, as well as a front wall and a rear wall each connected to both of the top frame and the bottom plate, and a left side wall and a right side wall being pivotally connected respectively to the left and right edges of the top frame by hinges respectively, to form an open top rectangular shaped auxiliary furnace body, the interior of the auxiliary furnace body defining an auxiliary furnace chamber, the left side wall and the right side wall being pivotal about hinges respectively between a downward position in which the left side wall and the right side wall close the auxiliary furnace chamber and an upward position in which the left side wall and the right side wall open the auxiliary furnace chamber or rest on the top frame; the charcoal disc is arranged on the bottom frame of the main furnace, the left triangle side panels and the right triangular side panels of the main furnace are set in a downward position, the front cover and the rear cover of the main furnace are in an open position, and a special teppanyaki plate is placed on the support bars of the main furnace within the main furnace chamber.

Preferably the babercue oven further comprises an auxiliary furnace, in which the auxiliary furnace includes a top frame and a base plate, as well as a front wall and a rear wall each connected to both of the top frame and the bottom plate, and a left side wall and a right side wall being pivotally connected respectively to the left and right edges of the top frame by hinges respectively, to form an open top rectangular shaped auxiliary furnace body, the interior of the auxiliary furnace body defining an auxiliary furnace chamber, the left side wall and the right side wall being pivotal about hinges respectively between a downward position in which the left side wall and the right side wall close the auxiliary furnace chamber and an upward position in which the left side wall and the right side wall open the auxiliary furnace chamber or rest on the top frame; the charcoal disc is arranged on the bottom frame of the main furnace, the left triangle side panel and the right triangular side panel of the main furnace are set in a downward position, the front cover and the rear cover of the main furnace are in an open position, and a hot pot basin is placed on the support bars of the main furnace within the main furnace chamber.

Preferably the babercue oven further comprises an auxiliary furnace, in which the auxiliary furnace includes a top frame and a base plate, as well as a front wall and a rear wall each connected to both of the top frame and the bottom plate, and a left side wall and a right side wall being pivotally connected respectively to the left and right edges of the top frame by a hinge joint respectively, to form an open top rectangular shaped auxiliary furnace body, the interior of the auxiliary furnace body defining an auxiliary furnace chamber, the left side wall and the right side wall being pivotal about hinges respectively between a downward position in which the left side wall and the right side wall close the auxiliary furnace chamber and an upward position in which the left side wall and the right side wall open the auxiliary furnace chamber or rest on the top frame; the periphery and height dimensions of the auxiliary furnace chamber is slightly larger than those of the main furnace body for store the main furnace in the auxiliary furnace and for portable.

According to the barbecue oven of the present invention, the top of the main furnace is provided with the inclined tile roof shaped main furnace top portion which is constituted by the hinged left and right triangular side plates and the detachable connecting rod means, and the furnace chamber can be covered by the hinged front and rear covers. Therefore, the handled fork forking a food to be barbecue can be inclined erected on the top portion of the main furnace or inclined inserted into the interior of the main furnace chamber and the auxiliary furnace chamber for charcoal grill or roasting in a hanging manner to avoid the food to contact the iron grid. As the food is racked into 35-45 degrees, the food is heated evenly, and the oil secretion and dripping will flow toward fireside to prevent from dropping onto the burning charcoal and causing burning flames. In addition, due to the adoption of articulated structure, the present barbecue oven can be used for charcoal grill, roasting, teppanyaki grill and hot pot cooking, etc., and can be stored and carried conveniently

BRIEF DESCRIPTION OF THE DRAWINGS

The multifunction barbecue oven according to the present invention will be described in details for illustration purpose with reference to the accompanying drawings, in which:

FIG. 1 is an exploded perspective view of a first embodiment of the barbecue oven according to the present invention;

FIG. 2 is a partly enlarged sectional view taken along a line II-II of FIGS. 1, 5, 7 and 9;

DETAILED DESCRIPTION OF THE INVENTION

Figure 3A:
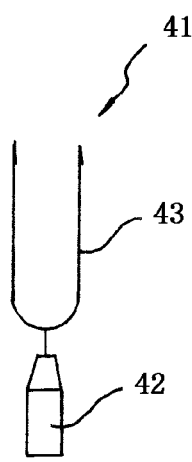
FIGS. 3A-3F are structural schematic views of handled forks of the multifunction barbecue oven according to the present invention.
Figure 3B:
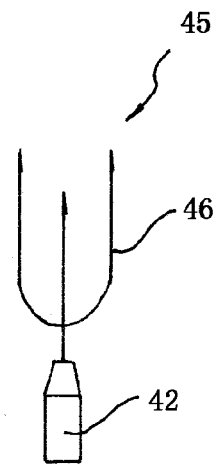
Figure 3C:
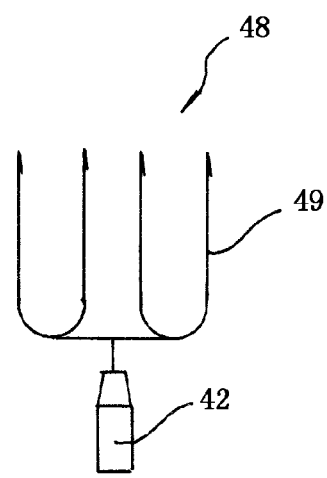
Figure 3D:
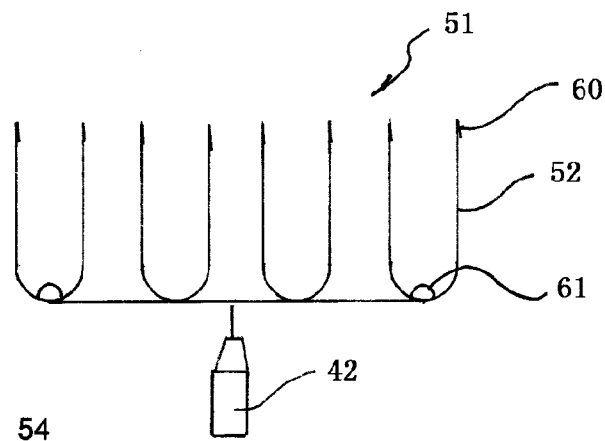

The components of the multifunction barbecue oven according to the present invention can be combined flexibly as needed to realize different structures, functions and applications of charcoal grilling, roasting, teppanyaki grilling and hot pot cooking. Several embodiments of the multifunction barbecue oven according to the present invention are described for illustration purpose with reference to the drawings, but the present invention is not limited thereto. In each of the following embodiments, the same components are marked with the same reference numerals.

FIG. 1 shows an exploded perspective view of a first embodiment of the barbecue oven according to the present invention. As shown in FIG. 1, the barbecue oven 110 comprises a main furnace 2 and a charcoal disc 4. The main furnace 2 comprises a bottom frame 11, as well as a front wall 12, a left wall 13, a rear wall 14 and a right wall 15 erected from the bottom frame 11, to form a rectangular main furnace body 16 with an open top and an open bottom. The interior of the main furnace body 16 defines a main furnace chamber 17. A horizontally extending support bar 19 is arranged on an inner surface of the front wall 12, and the distance of the support bar 19 from a top edge of the front wall 12 is approximately ⅓ of the height of the front wall. A horizontally extending support bar 20 is also arranged on an inner surface of the rear wall 14, and the distance of the support bar 20 from a top edge of the rear wall 12 is approximately ⅓ of the height of the rear wall. A left triangular side panel 23 and a right triangle side panel 24 are pivotally connected respectively to the top edge of the left side wall 13 and the top edge of the right side wall 15 by hinges 22 respectively. The left triangle side panel 23 and the right triangular side panel 24 are pivotal about the hinges 22 respectively between a downward position in which the left triangle side panel 23 and the right triangular side panel 24 lie on an outer surface of the left side wall 13 and the right side wall 15 respectively and an upward vertical position. The angle between a waist edge and a bottom edge of each of the triangle left side panel and the triangular right side panel is 35-45 degrees. On the inner surface of each triangle side panel, an inward recessed pocket-shaped socket 25 is formed by means of stamping near a top position of each triangle side panel. A detachable connecting rod means 26 is provided, which is comprised of a two-bar connector 27 and inserters 28 fixed to both ends of the former. When the left triangle side panel 23 and the right triangular side panel 24 are in its upward vertical position, the connecting rod means 26 is inserted via its inserters 28 into the pocket-shaped socket 25, and connected the left side panel 23 integrally with the right side panel 24, as shown in FIG. 2. The charcoal disc 4 comprises a chassis 31 with a plurality of vents 33 provided therethrough. Two bars 34 are provided on an upper surface of the chassis 31 near its front and rear edges. When in use, the charcoal disc 4 is selectively placed on the bottom frame 11 of the main furnace 2 or on the support bars 19 and 20 of the main furnace 2. The peripheral dimension of the charcoal disc 4 is slightly smaller than that of the main furnace chamber 17 of the main furnace 2.

Figure 3E:
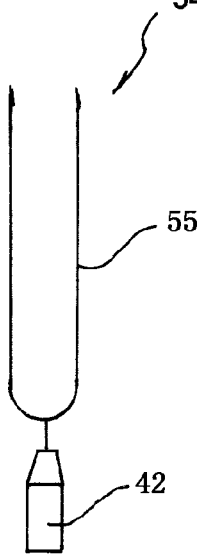
Figure 3F:
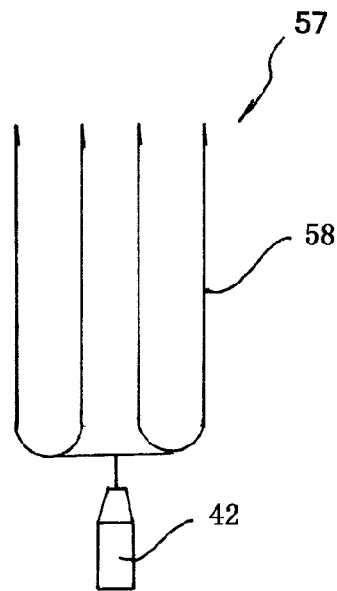
Figure 4:
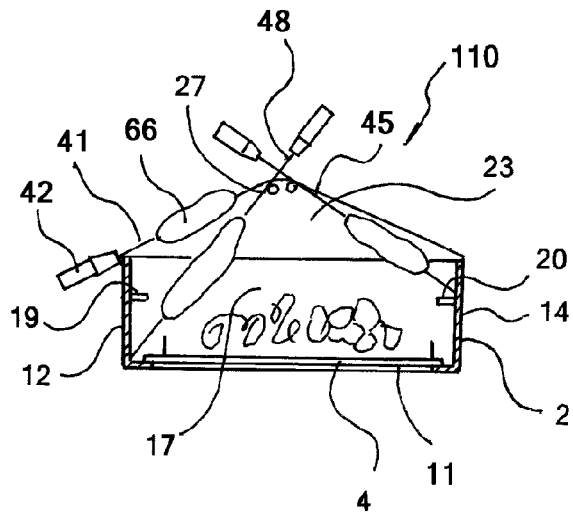
FIG. 4 is a sectional view taken along a line IV-IV of FIG. 1, showing the structural schematic view of the assembly of the barbecue oven.

FIGS. 3A-3F show the structural shapes of various handled forks used for the multifunction barbecue oven according to the present invention. There may be two kinds of forks, i.e. a single-handled long fork and a single-handled short fork, each having a single handle and a plurality of points connected thereto. The handled fork may include with different number of points with various length. As shown in FIGS. 3A-3D, a two-point short fork 41 has a handle 42 and two points 43 connected thereto; a three-point short fork 45 has a handle 42 and three points 46 connected thereto; a four-point short fork 48 has a handle 42 and four points 49 connected thereto; and an eight-point short fork 51 has a handle 42 and eight points 52 connected thereto. As shown in FIGS. 3E-3F, a two-point long fork 54 has a handle 42 and two points 55 connected thereto; and a four-point long fork 57 has a handle 42 and four points 58 connected thereto. In the present embodiment, each point could be made of a flat sheet of stainless steel having a cross-section of 4×2 mm, the length of a point of a short fork is approximately 130 mm, and the length of a point of a long fork is approximately 230 mm. A distal end 60 of each point is sharpened, and a root of each point is provided with a stopper 61, if needed, to prevent the handled fork from sliding down when it is inclinedly supported on the connecting rod 27 of the top of the barbecue oven. The above illustration shows only several examples. The form, the number and the length of the forks are determined according to the structure size and the needs of the barbecue oven. The present invention will not be limited thereto FIG. 4 shows a structural schematic view of the assembly of the first embodiment of the barbecue oven shown in FIG. 1. The barbecue oven 110 may be configured such that the charcoal disc 4 is arranged on the bottom frame 11 of the main furnace 2. The left triangular side panel 23 and the right triangle side panel 24 of the main furnace 2 are set in the upward vertical position. The connecting rod means 26 is inserted via the inserters 28 at both ends thereof into the pocket-shaped sockets 25 and is connected integrally with the left triangular side panel 23 and the right triangular side panel 24. The left triangular side plate 23 and the right triangular side plate 24 of the main furnace 2 and the connecting rod means 26 constitute together a top portion of the main furnace 2 which has a tile roof shape. During the use of the barbecue oven 110, the single-handle short fork forking food 66 to be barbecued is inclinedly supported on the top portion of the main furnace 2 and/or inclinedly inserted into the interior of the main furnace chamber 17 for barbecuing in a hanging manner. As shown in FIG. 4, the two-point short fork 41, etc., is obliquely erected between the connecting rod 27 and the top edge of the front wall 12 with the handle 42 in a downward direction. A three-point short fork 45, etc., is obliquely erected between the connecting rod 27 and the support bar 20 of the rear wall 14 of the main furnace 2 with the handle 42 in an upward direction. The four-point short fork 48, etc, is obliquely erected between the connecting rod 27 and the bottom frame 11 of the main furnace 2 with the handle 42 in an upward direction. The above different erected manners can gradually increase heat reaching the food. In the main furnace chamber 17, the temperature at the center of the furnace is higher than the temperature at the sides thereof. In the present barbecue oven 110, the food could be heated evenly since being supported at an angle of 35-45 degrees, and oil and drops secreted from food will flow toward the sides of the furnace and will not drip onto the burning charcoal, while will not incur flame and thus will not make the food burnt. In addition, because there are not iron grids, the present barbecue oven 110 can prevent food from contacting carcinogens formed of soot carbon. Furthermore, because of the two-rod connector 27, the single-handle short fork forked with cooked food 66 can be inserted via its front end 60 into between the two connecting rods, to keep the food warm.

Figure 5:
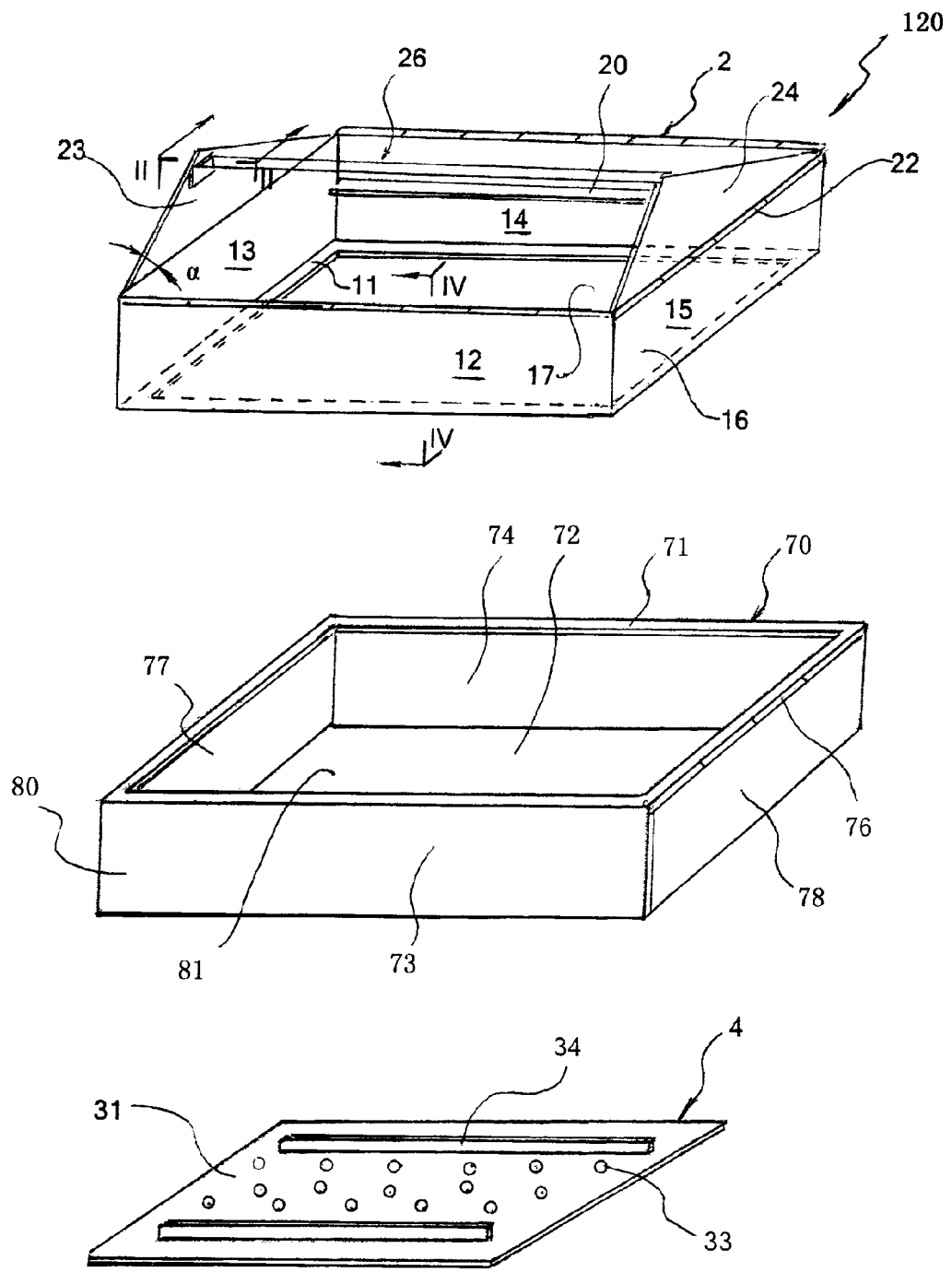
FIG. 5 is an exploded perspective view of a second embodiment of the barbecue oven according to the present invention.

FIG. 5 shows an exploded perspective view of a second embodiment of the barbecue oven according to the present invention. As shown in FIG. 5, the barbecue oven 120 comprises a main furnace 2, a charcoal disc 4 and an auxiliary furnace 70. In this embodiment, the structures of the main furnace 2 and the charcoal disc 4 are same as those of the first embodiment, the description thereof in detail is omitted herein. The auxiliary furnace 70 comprises a top frame 71 and a base plate 72, as well as a front wall 73 and a rear wall 74 each connected to both of the top frame 71 and the bottom plate 72. A left side wall 77 and a right side wall 78 are pivotally connected respectively to a left edge and a right edge of the top frame 71 by hinges 76 respectively, to form a rectangular shaped auxiliary furnace body 80 with an open top. The interior of the auxiliary furnace body 80 defines an auxiliary furnace chamber 81. The left side wall 77 and the right side wall 78 are pivotal about the hinges 76 respectively between a downward position in which the left side wall 77 and the right side wall 78 close the auxiliary furnace chamber 81 and an upward position in which the left side wall 77 and the right side wall 78 open the auxiliary furnace chamber 81 or rest on the top frame 71. The size of the auxiliary furnace chamber 81 is slightly larger than that of the main furnace body 16. When the oven is not in use, it is portable by placing the main furnace 2 into the auxiliary furnace 70.

Figure 6:
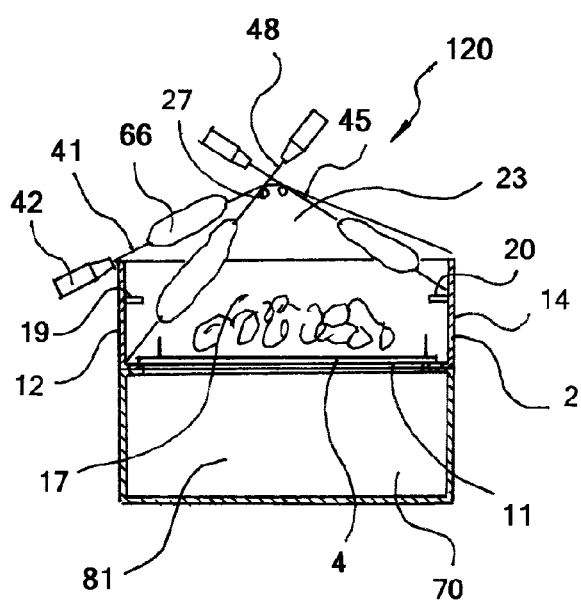
FIG. 6 is a sectional view taken along a line VI-VI of FIG. 5, showing the structural schematic view of the assembly of the barbecue oven.

FIG. 6 shows a structural schematic view of the assembly of the second embodiment of the barbecue oven shown in FIG. 5. In this embodiment, the barbecue oven 120 is configured in such manner that the assembled structures of the main furnace 2 and the charcoal disc 4 are same as those of the first embodiment and that the charcoal disc 4 is arranged on the bottom frame 11 of the main furnace 2. During the use of the barbecue furnace 120, the fire can be controlled by adjusting the open degree of the left side wall 77 and the right wall 78 which are hinged connected to the auxiliary furnace 70. When the main furnace 2 is in use, it can also preheat raw food or keep cooked food (not shown) warm simultaneously in the auxiliary furnace chamber 81 of the auxiliary furnace 70 by closing the left side wall 77 and the right wall 78.

Figure 7:
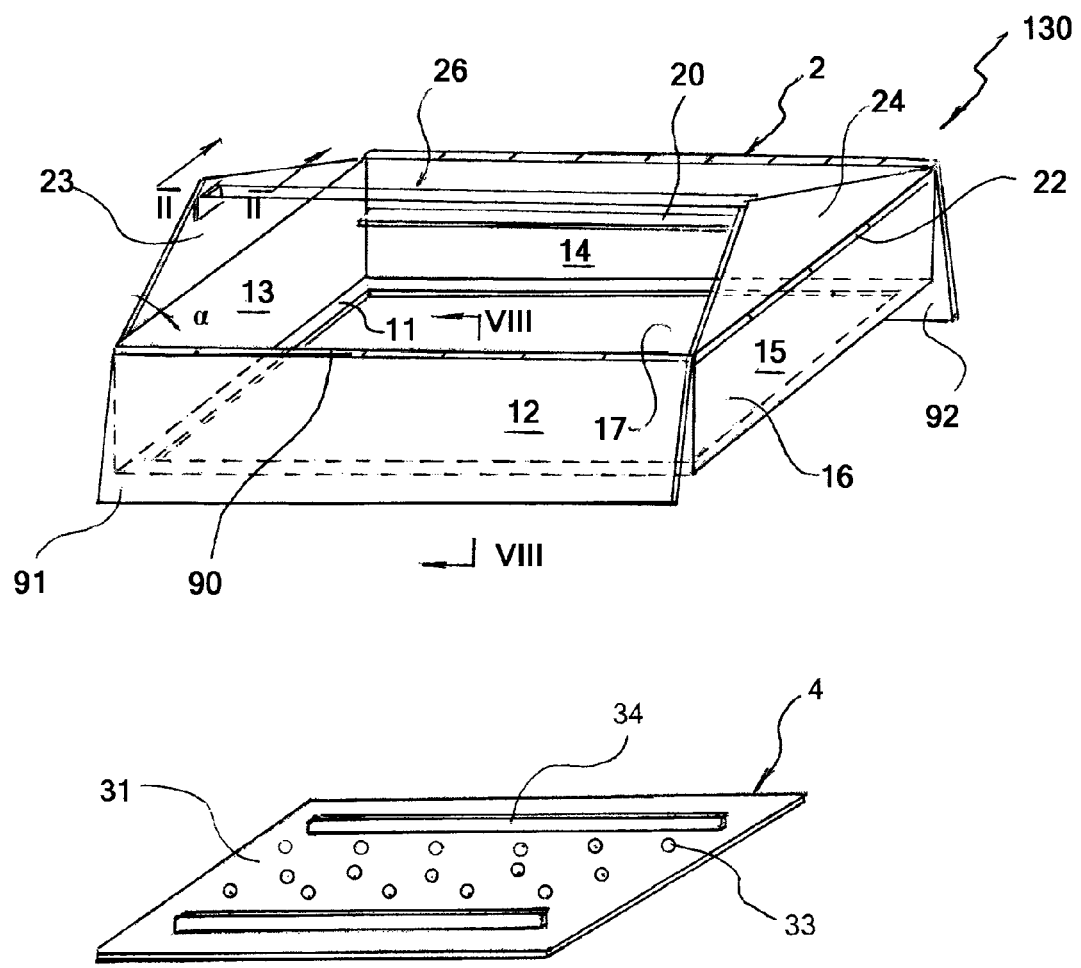
FIG. 7 is an exploded perspective view of a third embodiment of the barbecue oven according to the present invention.

FIG. 7 shows an exploded perspective view of a third embodiment of the barbecue oven according to the present invention. The barbecue oven 130 comprises a main furnace 2 and a charcoal disc 4. The main structures of the main furnace 2 and charcoal disc 4 are the same as those of the first embodiment except that a front cover 91 and a rear cover 92 are pivotally connected respectively to the top edge of the front wall 12 and the top edge of the rear wall 15 by hinges 22 respectively. Each of the front cover 91 and the rear cover 92 is pivotal about the hinge 22 between a downward position and an upward and inward position.

Figure 8:
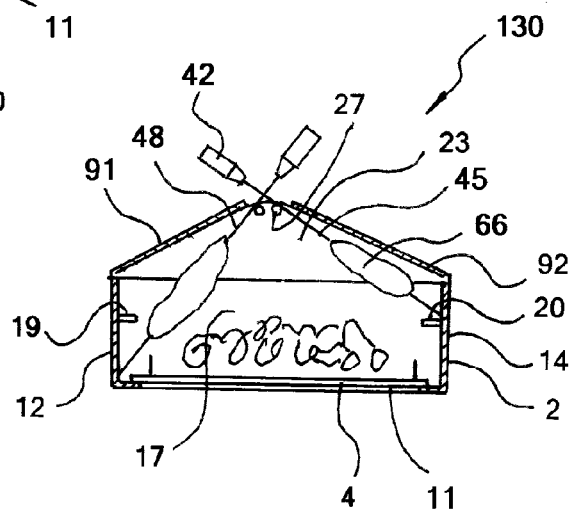
FIG. 8 is a sectional view taken along a line VIII-VIII of FIG. 7, showing the structural schematic view of the assembly of the barbecue oven.

FIG. 8 shows a structural schematic view of the assembly of the third embodiment of the barbecue oven shown in FIG. 7. The barbecue oven 130 is configured such that the charcoal disc 4 is arranged on the bottom frame 11 of the main furnace 2. The left triangular side panel 23 and the right triangle side panel 24 of the main furnace 2 are set in the upward vertical position. The connecting rod means 26 is inserted via the inserters 28 at both ends thereof into the pocket-shaped socket 25 and is connected integrally with the left triangular side panel 23 and the right triangular side panel 24. The left triangular side plate 23 and the right triangular side plate 24 of the main furnace 2 and the connecting rod means 26 constitute together a top portion of the main furnace 2 which has a tile roof shape. The front cover 31 and the rear cover 32 contact respectively the sides of the waist of the left triangular side panel 23 and the right triangular side panel 24 to close more than half of the top portion of the furnace. In use of the barbecue oven 130 for roasting, as shown in FIG. 8, the three-point short fork 45 forking food to be barbecue 66, etc., is obliquely erected between the connecting rod 27 and the support bar 20 of the rear wall 14 of the main furnace 2 with the handle 42 in an upward direction. The four-point short fork 48, etc, is obliquely erected between the connecting rod 27 and the bottom frame 11 of the main furnace 2 with the handle 42 in an upward direction.

Figure 9:
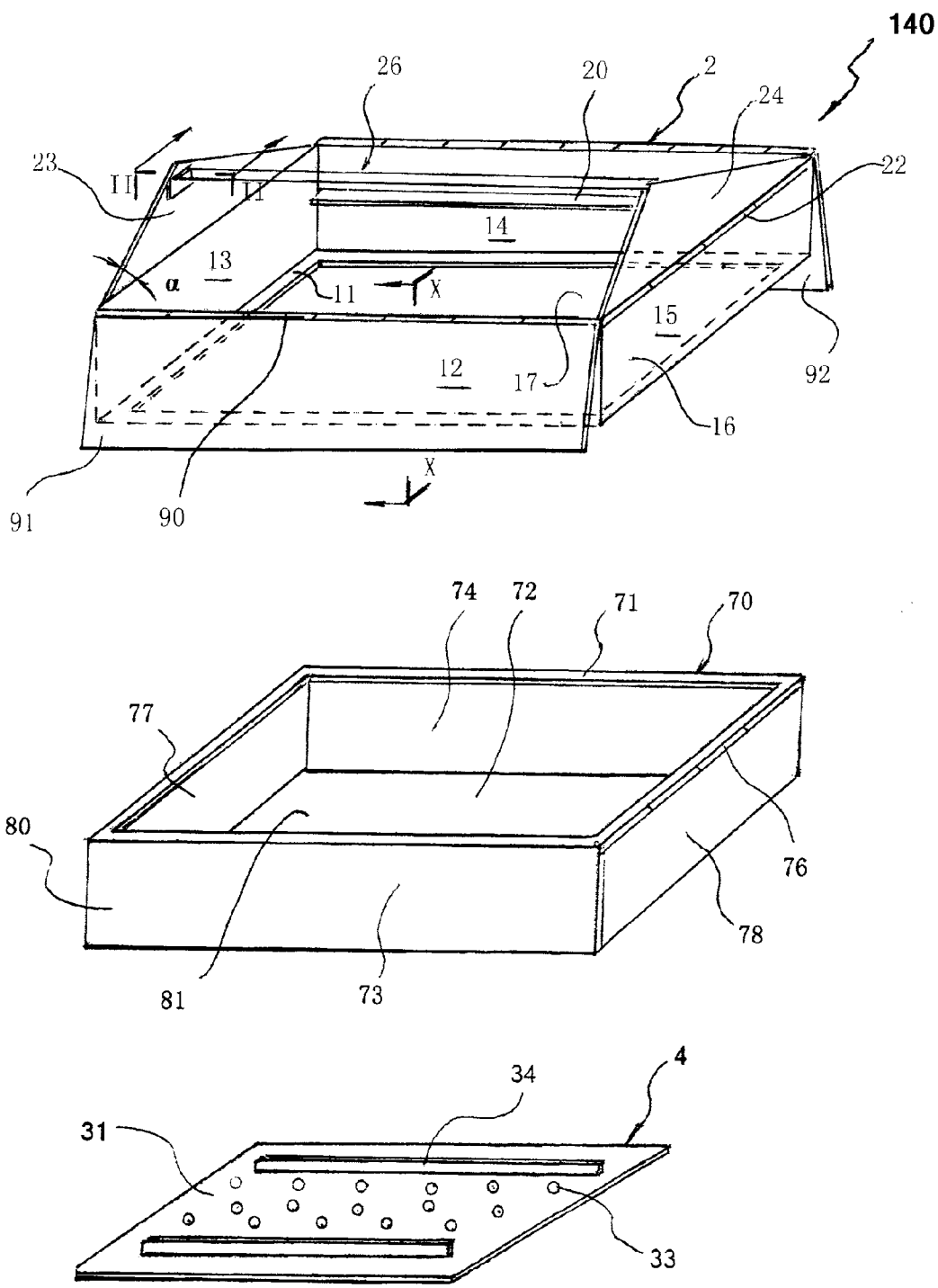
FIG. 9 is an exploded perspective view of a fourth embodiment of the barbecue oven according to the present invention.

FIG. 9 shows an exploded perspective view of a fourth embodiment of the barbecue oven according to the present invention. The barbecue oven 140 comprises a main furnace 2, a charcoal disc 4 and an auxiliary furnace 70. In this embodiment, the structures of the main furnace 2 and the charcoal disc 4 are same as those of the third embodiment, the structure of the auxiliary furnace 70 are same as that of the second embodiment, the description thereof in detail is omitted herein.

Figure 10:
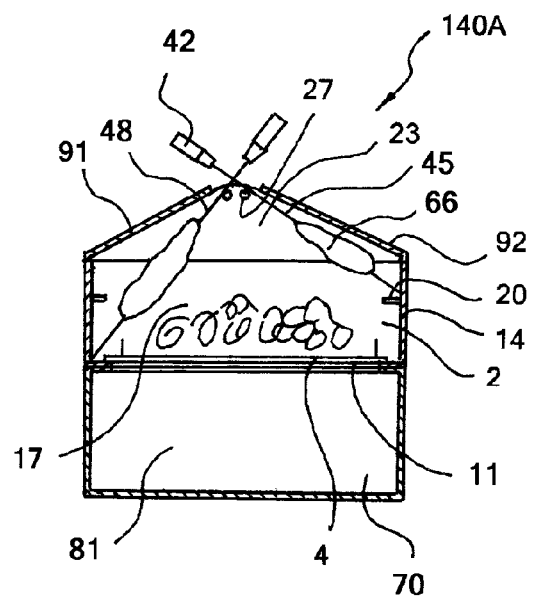
FIG. 10 is a sectional view taken along a line X-X of FIG. 9, showing a schematic view of a first assembly structure of the barbecue oven according to the present invention.

FIG. 10 shows a schematic view of the first assembly structure of the fourth embodiment of the barbecue oven shown in FIG. 9. During use of the barbecue oven 140A, the main furnace 2 is arranged on the auxiliary furnace 70 and the charcoal disc 4 is arranged on the bottom frame 11 of the main furnace 2. The left triangular side panel 23 and the right triangle side panel 24 of the main furnace 2 are set in the upward vertical position. The connecting rod means 26 is inserted via the inserters 28 at both ends thereof into the pocket-shaped socket 25 and is connected integrally with the left triangular side panel 23 and the right triangular side panel 24. The left triangular side plate 23 and the right triangular side plate 24 of the main furnace 2 and the connecting rod means 26 constitute together a top portion of the main furnace 2 which has a tile roof shape. The front cover 31 and the rear cover 32 contact respectively the sides of the waist of the left triangular side panels 23 and the right triangular side panels 24 to close more than half of the top portion of the furnace. During use of the barbecue oven 140A for roasting, as shown in FIG. 10, the three-point short fork 45 forking a food to be barbecue 66, etc., is obliquely erected between the connecting rod 27 and the support bar 20 of the rear wall 14 of the main furnace 2 with the handle 42 in an upward direction. The four-point short fork 48, etc, is obliquely erected between the connecting rod 27 and the bottom frame 11 of the main furnace 2 with the handle 42 in an upward direction. As the furnace chamber is small and can be covered, the heat will not leak and the food is heated more quickly and evenly. One can roast 16 pieces of food for only 5-7 minutes, using less charcoal. During use of the barbecue oven 140A, the fire can be controlled by regulating the open degree of the hinged left side wall 77 and right side wall 78.

Figure 11:
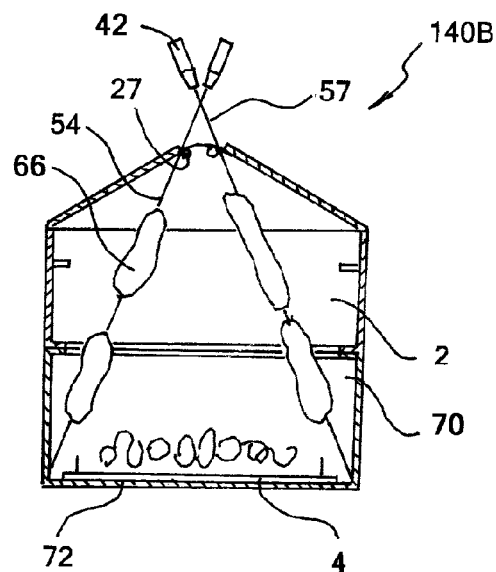
FIG. 11 is a sectional view similar to FIG. 10, showing a schematic view of a second assembly structure of the barbecue oven according to the present invention.

FIG. 11 shows a schematic view of the second assembly structure of the fourth embodiment of the barbecue oven shown in FIG. 9. The barbecue oven 140B is configured such that the assembled structure thereof is basically same as that of the barbecue oven 140A as shown in FIG. 10. The only difference is that the charcoal disc 4 is not arranged on the bottom frame 11 of the main furnace 2, but on the bottom plate 72 of the auxiliary furnace 70. During use of the barbecue oven 140B for roasting, the double-point long fork 54 and the eight-point long fork 57 which fork food to be barbecue 66, etc., is obliquely erected between the connecting rod 27 and the bottom plate 72 of the auxiliary furnace 70 with the handle 42 in an upward direction. Because the main furnace 2 and the auxiliary furnace 70 are arranged one above the other, such that the main furnace chamber 17 and the auxiliary furnace chamber 51 are communicated with each other and the volume of the furnace chamber for roasting is increased. The use of a long fork will, in general, support two pieces of food 91, and therefore, up to 16 pieces of food can be roasted simultaneously, greatly reduce large amount of charcoal. Similarly, during use of the barbecue oven 140B, the fire can be controlled by regulating the open degree of the hinged left side wall 77 and right side wall 78.

Figure 12:
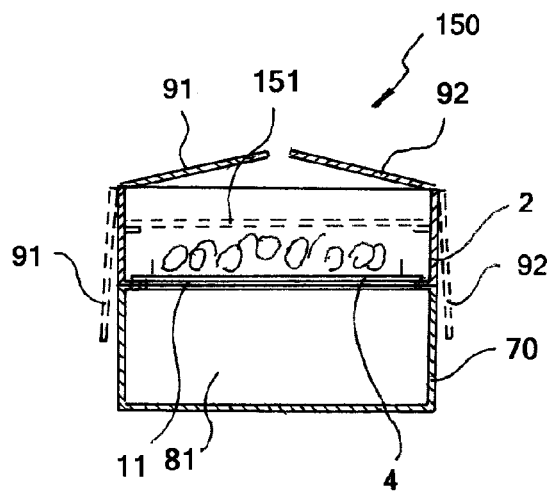
FIG. 12 is a structural schematic view illustrating the assembly of a fifth embodiment of the barbecue oven according to the present invention.
Figure 13:
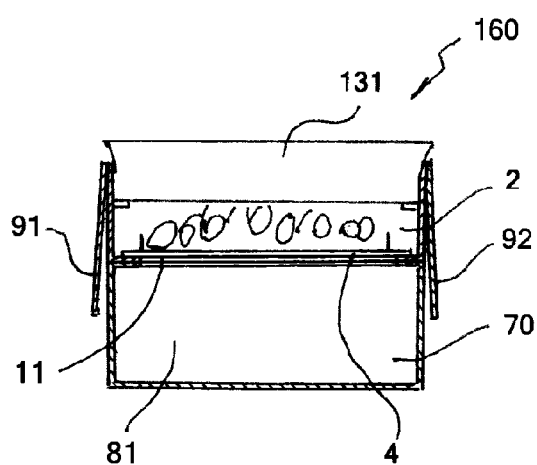
FIG. 13 is a structural schematic view illustrating the assembly of a sixth embodiment of the barbecue oven according to the present invention.

FIG. 12 shows a structural schematic view illustrating the assembly of the fifth embodiment of the barbecue oven according to the present invention. The barbecue oven 150 is configured such that the main furnace 2 is arranged on the auxiliary furnace 70 and the charcoal disc 4 is arranged on the bottom frame 11 of the main furnace 2. The left triangle side panel 23 and the right triangular side panel 24 of the main furnace 2 are in a downward position. The connecting rod means 26 is removed from the left triangular side panel 23 and the right triangular side panel 24. The front cover 91 and the rear cover 92 of the main furnace 2 is pivotal upwardly and inwardly to a position adjacent to a top edge of the left side wall 13 and the right wall 15 to form an tilt-shaped flat top portion, in order to use the front cover 91 and the rear cover 92 themselves as a teppanyaki plate, for putting the food thereon for teppanyaki grilling. Alternatively, the front cover 91 and the rear cover 92 can be opened, and an additional special teppanyaki plate 151 (as shown by broken lines in FIG. 12) is selectively used and placed on the support bars 19, 20 of the main furnace 2 to replace the front cover 91 and the rear cover 92 for processing the teppanyaki grilling of food. During use of the barbecue oven 150 for teppanyaki grilling, the fire can be controlled by regulating the open degree of the hinged left side wall 77 and right side wall 78.

FIG. 12 shows a structural schematic view illustrating the assembly of the sixth embodiment of the barbecue oven according to the present invention. The barbecue oven 160 is configured such that the main furnace 2 is arranged on the above of the auxiliary furnace 70 and the charcoal disc 4 is arranged on the bottom frame 11 of the main furnace 2. Similar to the fifth embodiment as shown in FIG. 12, the front cover 91 and the rear cover 92 are opened, and a hot pot basin 161 is placed on the support bars 19, 20 of the main furnace 2 for cooking. Similarly, during use of the barbecue oven 160 for hot pot cooking, the fire can be controlled by regulating the open degree of the hinged left side wall 77 and right side wall 78.

According to the present invention, the main furnace 2 and the auxiliary furnace 70 of the barbecue oven 140 can be used separately. For the main furnace 2, the charcoal disc 4 could be placed on the bottom frame 11 thereof, which may carry out the above-mentioned tilt barbecue, flat barbecue, teppanyaki grilling or hot pot cooking. For the auxiliary furnace 70, charcoal could be placed directly on the base plate 42, which may carry out flat barbecue. A special teppanyaki plate or a hot pot basin can also be placed in the auxiliary furnace chamber 51 for carrying out teppanyaki grilling or hot pot cooking. Thus, the main furnace 2 and the auxiliary furnace 70 can be used for various cooking separately at the same time.

According to the invention, when the babercue oven 140 is in the state of no use, the charcoal disc 4 and the handled forks and all other appliances can be placed into the interior of the main furnace chamber 17. Then, the front and rear covers 91, 92 of the main furnace 2 are closed, and one of the left side wall 77 and the right side wall 78 of the auxiliary furnace 70 are opened for inserting the main furnace 2 into the auxiliary furnace 70, which make it storable and portable.

What is claimed is:
1. A barbecue oven comprising:
   a main furnace including a bottom frame, as well as a front wall, a left wall, a rear wall and a right wall erected from the bottom frame to form a rectangular main furnace body with an open top and an open bottom, in which the interior of the main furnace body defines a main furnace chamber; a pair of horizontally extending support bars being arranged respectively on an inner surface of the front wall and the rear wall and the distance of the support bars from a top edge of the front wall and the rear wall being approximately ⅓ of the height of the front wall and the rear wall; a left triangular side panel and a right triangle side panel being pivotally connected respectively to the top edge of the left side wall and the top edge of the right side wall by hinges respectively, the left triangle side panel and the right triangular side panel being pivotal about the hinges respectively between a downward position in which the left triangle side panel and the right triangular side panel lying on an outer surface of the left side wall and the right side wall respectively and an upward vertical position, an angle between the waist edge and bottom edge of the triangle left side panel and the triangular right side panel being 35-45 degrees, respectively; an inward recessed pocket-shaped socket being formed near a top position of each triangle side panel on the inner surface of the left triangle side panels and the right triangular side panels; and a detachable connecting rod means having a two-bar connector and a pair of inserters fixed at its both ends, the inserters being adapted to be inserted into the pocket-shaped socket;
   a charcoal disc including a chassis with a plurality of vents provided therethrough and two bars disposed near a front edge and a rear edge of the chassis, the peripheral dimension of the charcoal disc being slightly smaller than that of the main furnace chamber; and
   a plurality of handled forks including a single-handled long fork and a single-handled short fork, each having a single handle and a plurality of points connected thereto.

2. The babercue oven according to claim 1, wherein the barbecue oven is configured such that the left triangular side panel and the right triangle side panel of the main furnace are set in the upward vertical position, the connecting rod means are inserted via the inserters into the pocket-shaped socket and connected integrally with the left triangular side panel and the right triangular side panel, and the left triangular side plate, the right triangular side plate and the connecting rod means form a top portion of the main furnace which has a tile roof shape.

3. The babercue oven according to claim 2, wherein the charcoal disc is arranged on the bottom frame of the main furnace and the single-handled short fork is inclinedly erected on top portion of the main furnace and/or is inclinedly inserted into the interior of the main furnace chamber.

4. The babercue oven according to claim 3, wherein the single-handled short fork is obliquely erected between the connecting rod and the top edge of the front wall or the top edge of the rear wall with the handle in a downward direction, and/or the single-handled short fork is obliquely erected between the connecting rod and the support bar of the front wall or the rear wall of the main furnace with the handle in an upward direction, and/or the single-handled short fork is obliquely erected between the connecting rod and the bottom frame of the main furnace with the handle in an upward direction.

5. The babercue oven according to claim 4, wherein the babercue oven further comprises an auxiliary furnace arranged below the main furnace, in which the auxiliary furnace includes a top frame and a base plate, as well as a front wall and a rear wall each connected to both of the top frame and the bottom plate, and a left side wall and a right side wall being pivotally connected respectively to the left and right edges of the top frame by hinges respectively, to form an open top rectangular shaped auxiliary furnace body, the interior of the auxiliary furnace body defining an auxiliary furnace chamber, the left side wall and the right side wall being pivotal about hinges respectively between a downward position in which the left side wall and the right side wall close the auxiliary furnace chamber and an upward position in which the left side wall and the right side wall open the auxiliary furnace chamber or rest on the top frame.

6. The babercue oven according to claim 1, wherein the main furnace further comprises a front cover and a rear cover which are pivotally connected respectively to the top edge of the front wall and the top edge of the rear wall by hinges respectively, the front cover and the rear cover being pivotal about the hinges respectively between its downward position and its upward and inward position.

7. The babercue oven according to claim 6, wherein the barbecue oven is configured such that the left triangular side panel and the right triangle side panel are set in the upward vertical position, the connecting rod means are inserted via the inserters at both ends thereof into the pocket-shaped socket and connected integrally with the left triangular side panel and the right triangular side panel, the left triangular side plate, the right triangular side plate and the connecting rod means form a top portion of the main furnace which has a tile roof shape, and the front cover and the rear cover contact respectively the waist edges of the left triangular side panel and the right triangular side panel to close more than half of the top portion of the furnace.

8. The babercue oven according to claim 7, wherein the charcoal disc is arranged on the bottom frame of the main furnace, the single-handled short fork is obliquely erected between the connecting rod and the support bar of the front wall or the rear wall of the main furnace with the handle in an upward direction, and/or the single-handled short fork is obliquely erected between the connecting rod and the bottom frame of the main furnace with the handle in an upward direction.

9. The babercue oven according to claim 7, wherein the babercue oven further comprises an auxiliary furnace arranged below the main furnace, in which the auxiliary furnace includes a top frame and a base plate, as well as a front wall and a rear wall each connected to both of the top frame and the bottom plate, and a left side wall and a right side wall being pivotally connected respectively to the left and right edges of the top frame by hinges respectively, to form an open top rectangular shaped auxiliary furnace body, the interior of the auxiliary furnace body defining an auxiliary furnace chamber, the left side wall and the right side wall being pivotal about hinges respectively between a downward position in which the left side wall and the right side wall close the auxiliary furnace chamber and an upward position in which the left side wall and the right side wall open the auxiliary furnace chamber or rest on the top frame.

10. The babercue oven according to claim 9, wherein the charcoal disc is arranged on the bottom frame of the main furnace, the single-handled short fork is obliquely erected between the connecting rod and the support bar of the front wall or the rear wall of the main furnace with the handle in an upward direction, and/or the single-handled short fork is obliquely erected between the connecting rod and the bottom frame of the main furnace with the handle in an upward direction.

11. The babercue oven according to claim 9, wherein the charcoal disc is arranged on the bottom plate of the auxiliary furnace, and the single-handled long fork is obliquely erected between the connecting rod and the bottom plate of the auxiliary furnace with the handle in an upward direction.

12. The babercue oven according to claim 6, wherein the barbecue oven is configured such that the charcoal disc is arranged on the bottom frame of the main furnace, the left triangular side panel and the right triangle side panel of the main furnace are set in a downward position, and the front cover and the rear cover of the main furnace are in a position adjacent to top edges of the left side wall and the right wall to form a tilt-shaped flat top teppanyaki plate.

13. The babercue oven according to claim 6, wherein the babercue oven further comprises an auxiliary furnace, in which the auxiliary furnace includes a top frame and a base plate, as well as a front wall and a rear wall each connected to both of the top frame and the bottom plate, and a left side wall and a right side wall being pivotally connected respectively to the left and right edges of the top frame by hinges respectively, to form an open top rectangular shaped auxiliary furnace body, the interior of the auxiliary furnace body defining an auxiliary furnace chamber, the left side wall and the right side wall being pivotal about hinges respectively between a downward position in which the left side wall and the right side wall close the auxiliary furnace chamber and an upward position in which the left side wall and the right side wall open the auxiliary furnace chamber or rest on the top frame; the charcoal disc is arranged on the bottom frame of the main furnace, the left triangular side panel and the right triangle side panel of the main furnace are set in a downward position, the front cover and the rear cover of the main furnace are in an open position, and a special teppanyaki plate is placed on the support bars of the main furnace within the main furnace chamber.

14. The babercue oven according to claim 6, wherein the babercue oven further comprises an auxiliary furnace, in which the auxiliary furnace includes a top frame and a base plate, as well as a front wall and a rear wall each connected to both of the top frame and the bottom plate, and a left side wall and a right side wall being pivotally connected respectively to the left and right edges of the top frame by hinges respectively, to form an open top rectangular shaped auxiliary furnace body, the interior of the auxiliary furnace body defining an auxiliary furnace chamber, the left side wall and the right side wall being pivotal about hinges respectively between a downward position in which the left side wall and the right side wall close the auxiliary furnace chamber and an upward position in which the left side wall and the right side wall open the auxiliary furnace chamber or rest on the top frame; the charcoal disc is arranged on the bottom frame of the main furnace, the left triangular side panel and the right triangle side panel of the main furnace are set in a downward position, the front cover and the rear cover of the main furnace are in an open position, and a hot pot basin is placed on the support bars of the main furnace within the main furnace chamber.

15. The babercue oven according to claim 6, wherein the babercue oven further comprises an auxiliary furnace, in which the auxiliary furnace includes a top frame and a base plate, as well as a front wall and a rear wall each connected to both of the top frame and the bottom plate, and a left side wall and a right side wall being pivotally connected respectively to the left and right edges of the top frame by a hinge joint respectively, to form an open top rectangular shaped auxiliary furnace body, the interior of the auxiliary furnace body defining an auxiliary furnace chamber, the left side wall and the right side wall being pivotal about hinges respectively between a downward position in which the left side wall and the right side wall close the auxiliary furnace chamber and an upward position in which the left side wall and the right side wall open the auxiliary furnace chamber or rest on the top frame; the periphery and height dimensions of the auxiliary furnace chamber is slightly larger than those of the main furnace body for store the main furnace in the auxiliary furnace and for portable.

\* \* \* \* \*